US005689709A

United States Patent [19]
Corbett et al.

[11] Patent Number: 5,689,709
[45] Date of Patent: Nov. 18, 1997

[54] METHOD AND SYSTEM FOR INVOKING METHODS OF AN OBJECT

[75] Inventors: Tom Corbett, Eugene, Oreg.; Peter H. Golde, Bellevue, Wash.; Mark S. Igra; Bradford H. Lovering, both of Seattle, Wash.

[73] Assignee: Microsoft Corporation, Redmond, Wash.

[21] Appl. No.: 595,527

[22] Filed: Feb. 1, 1996

Related U.S. Application Data

[63] Continuation of Ser. No. 975,832, Nov. 13, 1992, Pat. No. 5,515,536.
[51] Int. Cl.$^6$ .................................................. G06F 9/00
[52] U.S. Cl. .................................................. 395/683
[58] Field of Search .................................. 395/701, 703, 395/683

[56] References Cited

U.S. PATENT DOCUMENTS

| | | | |
|---|---|---|---|
| 5,093,914 | 3/1992 | Coplien et al. | 395/700 |
| 5,206,951 | 4/1993 | Khoyi et al. | 395/650 |
| 5,261,080 | 11/1993 | Khoyi et al. | 395/500 |
| 5,265,206 | 11/1993 | Shackelford et al. | 395/200 |
| 5,280,610 | 1/1994 | Travis, Jr. et al. | 395/600 |
| 5,341,478 | 8/1994 | Travis, Jr. et al. | 395/200 |
| 5,394,521 | 2/1995 | Henderson, Jr. et al. | 395/346 |
| 5,412,772 | 5/1995 | Monson | 395/335 |

OTHER PUBLICATIONS

*Inside Macintosh*, vol. VI, Apple Computer, Inc., Addison–Wesley Publishing Company, Inc., Menlo Park, California, 1991, pp. 6–1 through 6–117.

*Objective C® Compiler Version 4.0 User Reference Manual*, The Stepstone Corporation, Sandy Hook, Conneticut, 1987, Chapters 2–5.

Decouchant, Dominique, and Andrzej Duda, *Remote Execution and Communication in Guide—an Object–Oriented Distributed System*, 1990 IEEE, pp. 49–53.

Rymer, John R., "Common Object Request Broker: OMG's New Standard for Distributed Object Management," *Patricia Seybold's Network Monitor* 6(9):3–29, 1991.

*Primary Examiner*—Kevin A. Kriess
*Attorney, Agent, or Firm*—Seed and Berry LLP

[57] ABSTRACT

A computer method and system for invoking a function member of an object that is exposed to a client computer program by a source computer program are provided. In a preferred embodiment, the source computer program instantiates the object which has a dispatching interface. The dispatching interface has an invoking function member for receiving a name of a function member and arguments for the function member. When a client computer program wishes to invoke the function member, the client computer program invokes the invoking function member of the dispatching interface passing the name of the function member and arguments for the function member. The invoking function member invokes the function member with the passed name passing the arguments. When the function member returns, the invoking function member returns to the client computer program.

12 Claims, 6 Drawing Sheets

METHOD AND SYSTEM FOR INVOKING METHODS OF AN OBJECT

CROSS-REFERENCE TO RELATED APPLICATION

This application is a continuation of United States patent application Ser. No. 07/975,832, filed Nov. 13, 1992 U.S. Pat. No. 5,515,536.

TECHNICAL FIELD

This invention relates generally to a computer method and system for invoking methods, and in particular, a method and system for invoking methods of a late-bound object.

BACKGROUND OF THE INVENTION

The use of object-oriented programming techniques can facilitate the development of complex computer programs-Programming languages that support object-oriented techniques have been developed. One such programming language is C++. The C++ programming language is described in "The C++ Language Reference," published by Microsoft Corporation, which is hereby incorporated by reference.

Two common characteristics of object-oriented programming languages are support for data encapsulation and data type inheritance. Data encapsulation refers to the coupling of data to the functions that operate on the data. Inheritance refers to the ability to define a data type as an extension of other data types. An instance of a data type that couples data and functions is referred to as an "object."

An object is a run time structure for a user-defined type (a class type) that may contain data members and function members. Each class has a class definition that specifies its data members and function members. Each object is declared to be a certain class type. In a preferred embodiment, the run time data structures of an object conforms to the model defined in U.S. Pat. No. 5,297,284, entitled "Method and System for Implementing Virtual Functions and Virtual Base Classes and Setting a This Pointer for an Object-Oriented Programming Language," which is hereby incorporated by reference.

FIG. 1 is a block diagram illustrating typical data structures used to represent an object. The data structures comprise instance data structure 101, virtual function table 102, and the function members 103, 104, and 105. The instance data structure 102 contains a pointer to the virtual function table 102 and contains data members. The virtual function table 102 contains an entry for each virtual function member defined for the object. Each entry contains a reference to the code that implements the corresponding function member.

It is often useful for two computer programs to access the same instance of an object. For example, a first computer program instantiates an object in shared memory and notifies a second computer program of the location of the object. The second computer program then accesses the object in shared memory. However, to access the object, the second computer program typically needs to be written and compiled with the class definition of the object. Without the class definition, the second computer program would not know how to access the data members and function members of the object. Thus, a computer program is written and compiled with the class definition for each object it wishes to share with another computer program.

When the developer of a computer program wishes to allow other computer programs to access its objects, the developer publishes the class definitions of its objects. The developers of other computer programs could then incorporate the published class definitions into their computer programs. One skilled in the art would appreciate that this publication may incorporate a "header" file containing the class definitions. The developers of other computer programs could then write their computer programs to access objects defined in the header file and "include" the header file in the source code for the computer programs. The source code is then compiled. When the compiler encounters a class variable, it generates code based on the class definition. The process by which a variable is associated with its class definition is referred to as binding. (Binding in general refers to the associating of two pieces of information with one another.) Binding that occurs at compile time is referred to as early or static binding. Binding that occurs at run time is referred to as late or dynamic binding.

Because prior methods require that a class definition be available when developing a computer program, there has been limited sharing of objects between computer programs developed by independent developers. This limited sharing occurs because, for example, it is difficult to distribute class definitions to independent developers, who may be located throughout the world, in a timely manner. Similarly, it is difficult to distribute updates to the class definition and difficult for the developers to integrate these updates and distribute updated versions of the computer programs to users. These difficulties are compounded when a computer program incorporates class definitions provided by several developers.

To help overcome these difficulties by alleviating the need to have class definitions available at compile time, developers are cooperating to access objects through standard "interfaces." An interface is an abstract class with no data members and whose virtual functions have no implementation (are pure). An abstract class is a class in which a virtual function member is pure.

The following class definition is an example definition of an interface. This definition allows a program to access a document object of a word processing program. (One skilled in the art would appreciate that interfaces for other types of objects could be defined and used using analogous techniques.) By providing an implementation of this interface, any word processing program can allow its document objects to be accessed by other programs. The other programs are compiled using the interface definition. At run time, the other programs can request a pointer to a document object instantiated by the word processing program. Once the pointer is received, the other program can access the methods defined in the interface.

```
class IDocument
    {   virtual void Save() = 0;
        virtual void GetPara() = 0;
        virtual void Select() = 0;
        virtual void CreateTable() = 0;
        ...
    }
```

The developer of a word processing program would need to provide an implementation of each function of the interface to allow the word processing objects to be accessed by other programs.

A word processing developer may wish, however, to implement only certain function members and not all the function members of the interface. For example, a word processing developer may not want to implement table support (e.g., the CreateTable function member), but may want to support all other function members. To allow a word processing developer to support only some of the function members, while still allowing objects to be accessed, multiple interfaces for document objects may be defined. For example, the interfaces IDocTable and IDocBasic may be defined for a document object as follows.

```
class   IDocTable
        {       virtual void CreateTable() = 0;
        }
class   IDocBasic
        {       virtual void Save() = 0;
                virtual void GetPara() = 0;
                virtual void Select() = 0;
                ...
        }
```

Each word processing developer would implement the IDocBasic interface and, optionally, the IDocTable interface.

At run time, the other programs would need to determine whether a document object to be accessed supports the IDocTable interface. To make this determination, another interface is defined (that each document object implements) with a function member that indicates which interfaces are implemented for the object. This interface is known as IUnknown and is defined by the following.

```
class   IUnknown
        {       boolean QueryInterface (InterfaceID, void*) = 0;
                ...
        }
```

The IUnknown interface defines the function member (method) QueryInterface. The method QueryInterface is passed an interface identifier (e.g., "IDocTable") and returns a pointer to the identified interface for the object for which the method is invoked. If the object does not support the interface, then the method returns a false. The following definitions illustrate the use of the IUnknown interface.

```
class   IDocTable:IUnknown
        {       virtual void CreateTable() = 0;
        }
class   IDocBasic:IUnknown
        {       virtual void Save() = 0;
                virtual void GetPara() = 0;
                virtual void Select() = 0;
                ...
        }
```

FIG. 2 is a block diagram illustrating a sample data structure of a document object. The document object comprises interface data structure 201, IDocBasic interface data structure 202, IDocTable interface data structure 205, and methods 208 through 212. The interface data structure 201 contains a pointer to each interface implemented and may contain data members of the implementation. The IDocBasic interface data structure 202 contains instance data structure 203 and virtual function table 204. Each entry in the virtual function table 204 points to a method defined for the IDocBasic interface. The IDocTable interface data structure 205 contains instance data structure 206 and virtual function table 207. Each entry in the virtual function table 207 contains a pointer to a method defined in the IDocTable interface. Since the IDocBasic and IDocTable interfaces virtually inherit the IUnknown interface, each virtual function table 204 and 207 contains a pointer to the method QueryInterface 208.

The following pseudocode illustrates how other programs determine whether a document object supports the IDocTable interface.

```
if (pIDocBasic—>QueryInterface("IDocTable",&pIDocTable))
\*IDocTable supported
else
\*IDocTable not supported
```

The pointer pIDocBasic is a pointer the IDocBasic interface of the object. If the object supports the IDocTable interface, the method QueryInterface sets the pointer pIDocTable to point to the IDocTable data structure and returns true as its value. The other programs can retrieve a pointer pIDocBasic to an open document object by invoking a function whose prototype is published with the interface definitions and whose code is provided by the word processing developer. At run time, the other programs link to the function.

Although the use of multiple interfaces for an object facilitates accessing of objects, the developer of an object needs to publish the interface definitions so that other developers could use the definitions when compiling their programs. It would be desirable to allow programs to share objects without needing to access each of the interface definitions at compile time.

SUMMARY OF THE INVENTION

It is an object of the present invention to provide a method and system for invoking a function member of an object.

It is another object of the present invention to provide a method and system for dynamically binding to a method of an interface.

These and other objects of the invention, which will become more apparent as the invention is described more fully below, are obtained by providing a method and system for invoking a function member of an object that is exposed to a client computer program by a source computer program. In a preferred embodiment, the source computer program instantiates the object which has a dispatching interface. The dispatching interface has an invoking member function for receiving a name of a function member and arguments for the function member. When a client computer program wishes to invoke the function member, the client computer program invokes the invoking function member of the dispatching interface passing the name of the function member and arguments for the function member. The invoking function member invokes the function member with the passed name passing the arguments. In an alternate embodiment, an identifier of the name of a function member is passed rather than the name of the function member. In another alternate embodiment, the dispatching interface has a name identifier function member for converting the name of the function member to an ordinal. The invoking function member is then passed the ordinal rather than the name of the function member.

DETAILED DESCRIPTION OF THE INVENTION

The present invention provides a method and system for a computer program (source) to make its objects (data members and function members) accessible to other computer programs (clients) that are developed independently of the computer program. In a preferred embodiment of the present invention, a dispatching interface is defined for each object to be exposed to clients. The clients are aware of the definition of the dispatching interface at compile time, but not typically aware of other interfaces at compile time. The dispatching interface contains an "invoking method" through which other methods, not known to the client at compile time, can be invoked. To invoke such another method, a client invokes the invoking method passing it the name of the other method and arguments to passed to the named method. The name of the method and arguments can be input by a user of the computer system. The invoking method knows how to invoke the other methods of the exposed object. The invoking method invokes the named method passing it the arguments. When the named method returns, the invoking method then sets any return arguments and returns to the client. The invoking method preferably validates that the named method is implemented for the object and that the arguments are the correct number and type. The invoking method returns an error if the method name or arguments are invalid.

Figure 1:
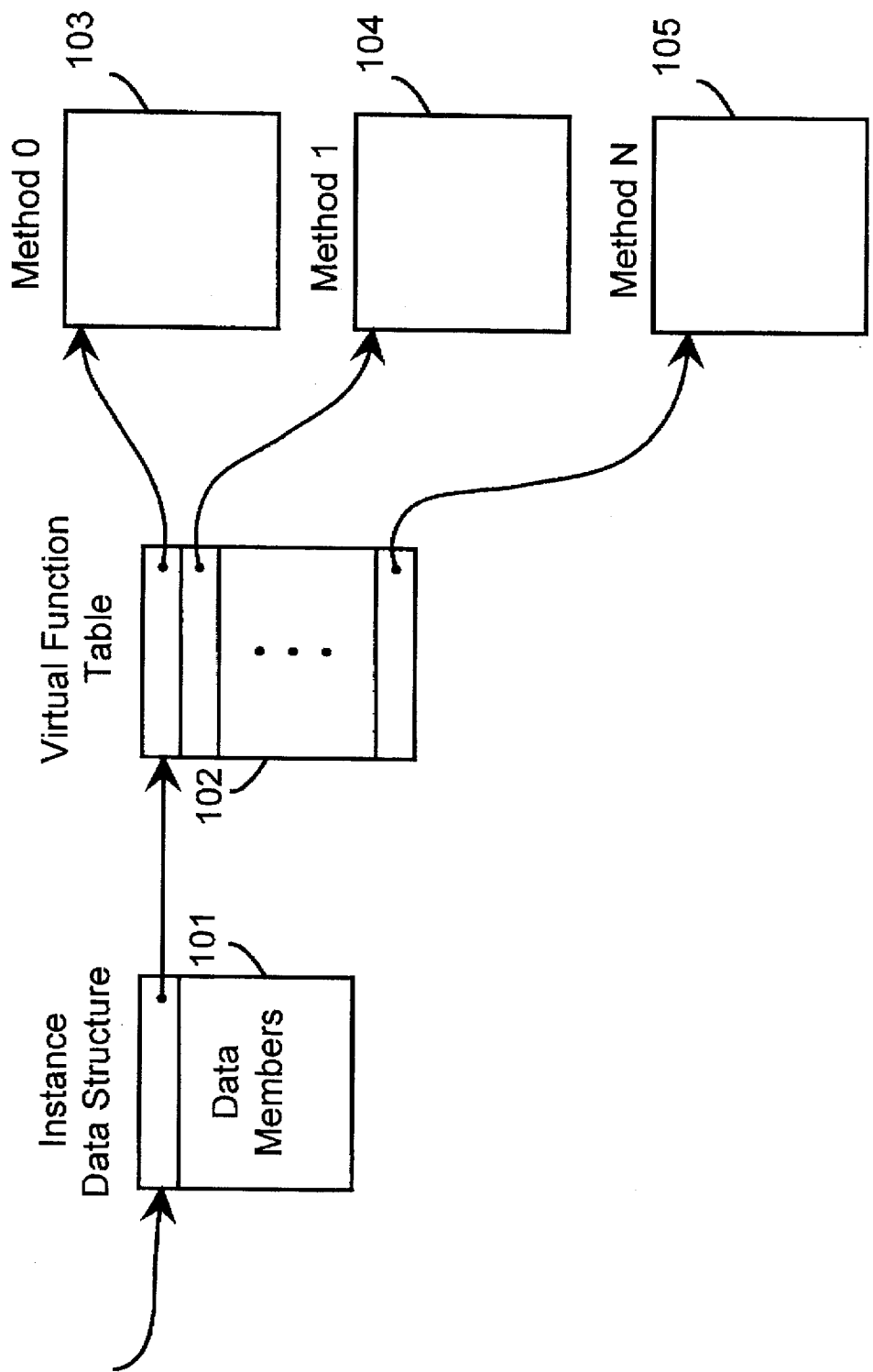
FIG. 1 is a block diagram illustrating typical data structures used to represent an object.
Figure 2:
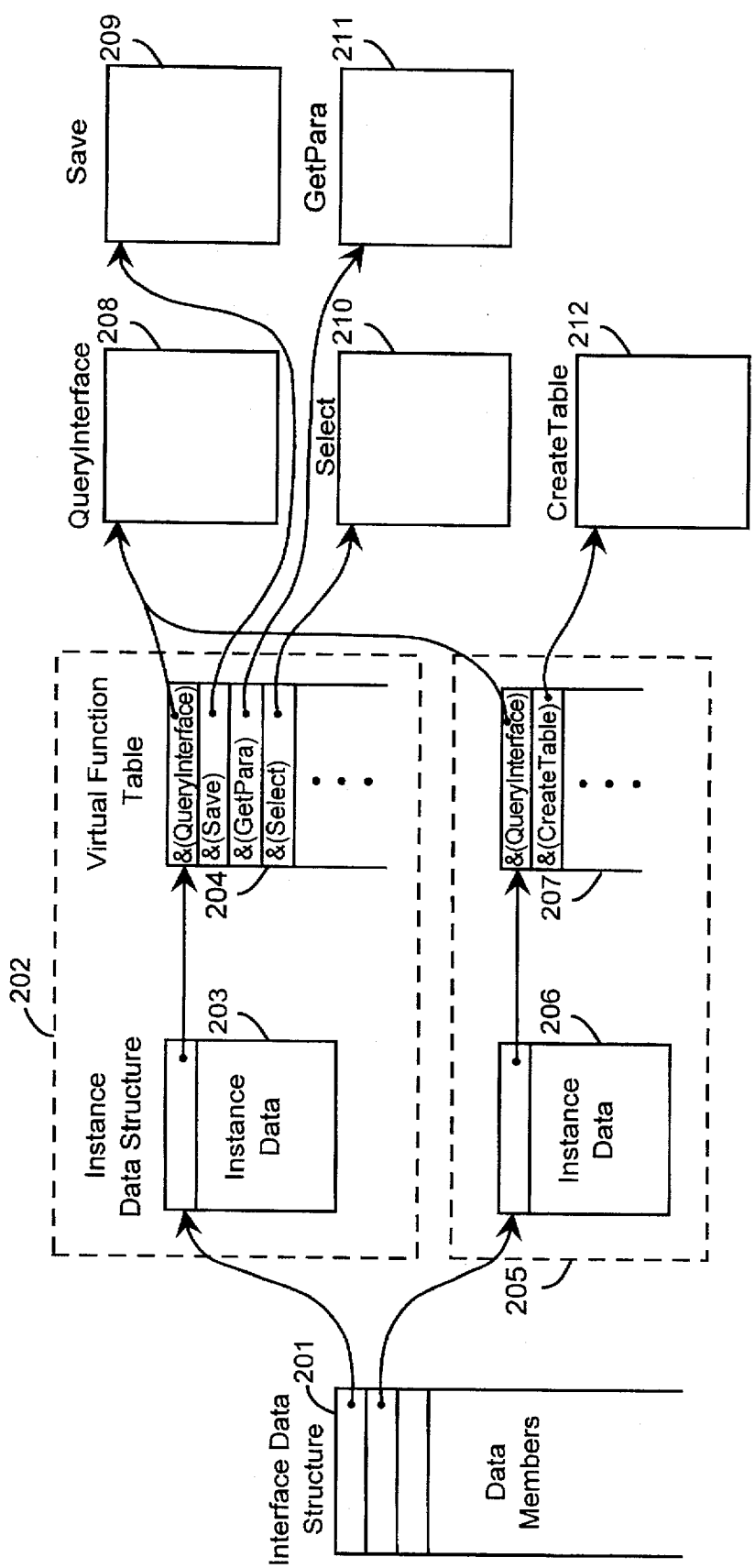
FIG. 2 is a block diagram illustrating a sample data structure of a document object.
Figure 3:
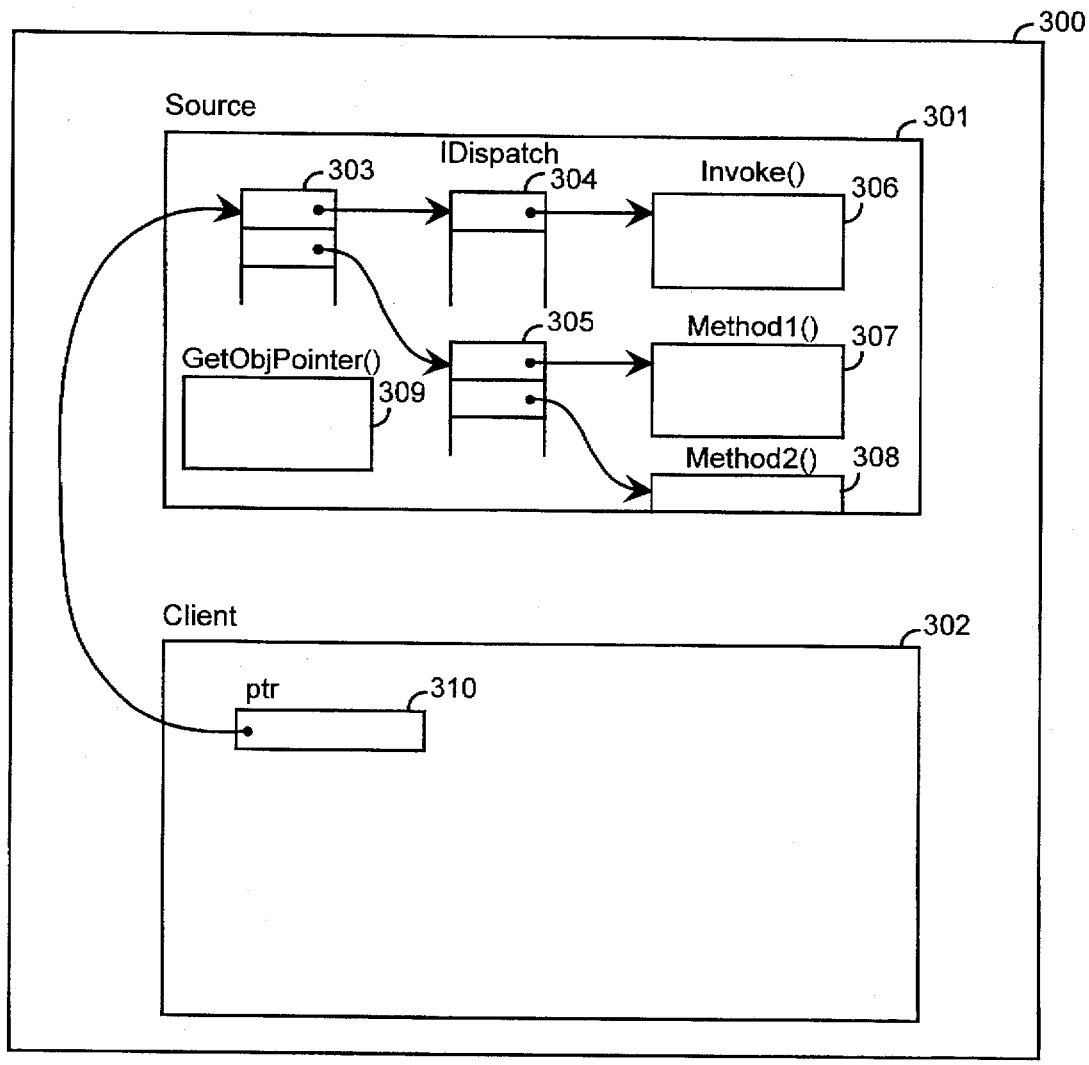
FIG. 3 is a flow diagram of a computer system of the present invention.

FIG. 3 is a flow diagram of a computer system of the present invention. The present invention is preferably implemented as computer programs executing on a computer system with a central processing unit and memory. The computer system 300 contains a source computer program 301 and a client computer program 302. The source 301 exposes object 303 to the client 302. The exposed object 303 contains a pointer to the virtual function table for the dispatching interface (IDispatch) 304 and pointers to the virtual function table for the other interfaces 305. The method Invoke 306 is the invoking method of the object. The function GetObjPointer 309 returns a pointer to the exposed object 303. To access methods 307 or 308 of the exposed object 303, the client 302 first receives the name of the function GetObjPointer 309. The name is typically input by a user of the client 302. The client 302 then invokes the function GetObjPointer 309 to retrieve the pointer 310 to the exposed object 303. In a preferred embodiment, the function GetObjPointer is stored in a dynamic link library of the Windows operating system developed by Microsoft Corporation. The client can retrieve the address of the function GetObjPointer 309 by using the function GetProcAddress of Windows. The client 302 then inputs (typically from a user) the name of a method (e.g., Method2) and arguments for the named method. The client 302 then invokes the method Invoke 306 passing it the name of the method and the arguments. The method Invoke validates the arguments and invokes the named method (e.g., Method2) passing it the arguments. When the named method returns, the method Invoke sets the return parameters and returns to the client 302. This technique of binding a name of a method to the code implementing the method at run time is referred to as late (or dynamic) binding.

IDISPATCH Interface

In a preferred embodiment, a client accesses an exposed object using the IDispatch interface. The IDispatch interface defines the method Invoke. Once a client has a pointer to an object, the client retrieves a pointer to the IDispatch interface by invoking the method QueryInterface.

```
IDispatch*pdisp
if (pobj—>QueryInterface(IID_IDispatch, &pdisp))
\*IDispatch supported
else
\*IDispatch not supported
```

If the method QueryInterface returns a false, then the methods of the object cannot be accessed through the IDispatch interface. If the method QueryInterface returns a true, then methods of the object can be invoked using the method Invoke of the IDispatch interface.

The IDispatch interface is defined as follows:

```
class IDispatch : publicIUnknown {
public:
    virtual SCODE Invoke(HGNAM hgnam,
                    WORD languageCode,
                    WORD wFlags,
                    VARIANTARG rgarg[],
                    INT cArgs,
                    HGNAM rghgnamArg[],
                    INT cNamedArgs,
                    VARIANTARG * lpargResult,
                    EXCEPINFO * lpExcepinfo,
                    WORD * lpwArgErr) = 0;
}
```

The method Invoke inputs the name of a function member and a list of actual arguments for the function member. The method Invoke validates the function member name and the arguments and then invokes the function member passing the arguments. When the function member returns, the method Invoke then returns with the return arguments returned by the function member. (In the following, the term parameter refers to the parameters of the method Invoke, and the term argument refers to the parameters of the named function member.) The parameter hgnam indicates the name of the function member to invoke. The parameter language-Code indicates the natural language of the function member name. The parameter wFlags indicates whether the function member name refers to a method or a property (described below). The parameter rgarg is an array of arguments for the named function member. The parameter cArgs indicates the number of arguments. The parameter rghgnamArg is an array of named arguments for the named function member. The parameter cNamedArgs indicates the number of named arguments for the named function member. The parameter lpargResult indicates where the return value of the named function member is to be stored. The parameter lpExcepinfo points to a data structure for storing exception information describing an error encountered when invoking the named function member. The parameter lpwArgErr points to an index within parameter rgarg indicating an argument with an incorrect type. The return value indicates whether an error occurred when invoking the named function member. The parameters are defined in detail below.

The arguments are stored in parameter rgarg from last to first. Thus, parameter rgarg[0] contains the last argument, and parameter rgarg[cArgs−1] contains the first argument. The function member can be invoked with either positional arguments or named arguments. Preferably, all named arguments follow all positional arguments. Thus, the named arguments are stored first in the parameter rgarg array. If parameter cNamedArgs is 0, then all the elements of parameter rgarg array are positional arguments. Each element of parameter rghgnamArg array contains the name of a named argument whose value is contained in the corresponding element of parameter rgarg array. For example, if a function member is to be invoked with two positional arguments, followed by three named arguments, (A, B, and C), then parameter cArgs would be 5, and parameter cNamedArgs would be 3. The first positional argument would be in parameter rgarg[4]. The second positional argument would be in parameter rgarg[3]. The value of named argument A would be in rgarg[2], with the name A in parameter rghgnamArg[2]. The value of named argument B would be in parameter rgarg[1], with the name B in parameter rghgnamArg[1]. The value of named argument C would be in parameter rgarg[0], with the name C in parameter rghgnamArg[0].

In a preferred embodiment, the names of function members and named arguments are stored in a name table. The names are passed as handles into the name table, rather than a string containing the characters in the name. The type HGNAM indicates handle into the name table. The use of handles for names allows for efficient processing of names. For example, comparison for name equality can be performed on a fixed-length handle, rather than a variable-length name. The handle and the name are referred to generically as identifiers of a name.

Since languages, such as C++, provide for the strong typing of variables, the parameter rgarg array can only contain one data type. However, the arguments to the various function members are typically many different types. As described below in detail, the present invention defines the type VARIANTARG, which allows weak typing to be simulated. The type VARIANTARG is a tagged union. The union allows the argument to be one of several types, and the tag identifies the type.

The parameter lpargResult indicates where the return value of the function member is to be stored. The client passes a pointer to a client-allocated VARIANTARG variable where the return value should be stored. If no return value is expected, the client passes a NULL. The method Invoke stores the return value in the variable pointed to by parameter lpargResult. The method Invoke may return a pointer to the return value in the variable pointed to by parameter lpargResult if the lifetime of the return value is the same as of the object. Thus, the method Invoke may return a pointer to a C++ data member within the object. In this way, the data member can be passed by reference to another method.

The method Invoke returns an error when:
(1) the object has no member with the specified name and specified number of arguments,
(2) the specified member is a void function and parameter lpargResult is not set to NULL,
(3) the specified member is not a void function and the parameter lpargResult is set to NULL,
(4) the parameter cNamedArgs is not zero and the specified method does not support named parameters, and
(5) one of the arguments is an inappropriate type.

In a preferred embodiment, the present invention also supports retrieving and storing the value of a property of an object. Some programming languages support properties. A property is a member which looks like a data member of an object. Two operations are possible with a property: retrieving the value and changing the value. For example, a paragraph object might have a property named "Justification," which can either be retrieved or changed. Retrieving the value of a property generally does not cause a user-visible change in the state of an object, but may change the internal state. Syntactically, a typical programming language might represent retrieving a property in the same way as assignment (e.g., value=object.property). Changing the value of a property may cause a user-visible change in the state of an object. For example, when the justification of a paragraph is changed, then if the paragraph is displayed, the display needs to be updated. Typically, a method is invoked when changing a property to effect the user-visible change in the state of an object. Syntactically, a typical programming language might represent changing a property in the same way as assignment (e.g., object.property=value). A compiler may generate a call to a method to effect the changing of a property value. A property can also be indexed and access like an array.

In a preferred embodiment, an object can have an "unnamed" property. In application programming languages, this unnamed property may be used when an intrinsic (non-object) value is needed, but an object is supplied. No member qualifier need actually be present. For example, if the identifier obj refers to an object, and i is an integer, the statement "i=obj" would be equivalent to "i=obj.unnamed." The ability to identify a property without specifying a name is a convenient way to refer to objects which have some primary value (e.g., spreadsheet cells, edit controls, database fields).

The method Invoke allows property members to be accessed the same way method members are accessed, except that the DISPATCH_PROPERTYGET or DISPATCH_PROPERTYPUT flag is set in parameter wFlags. When a language cannot distinguish between retrieving a property and a method call, then it is preferable that both the DISPATCH_PROPERTYGET and DISPATCH_METHOD flags of parameter wFlags be set. If the client wants to get the current value of a property, the parameter wFlags is set to DISPATCH_PROPERTYGET, parameter hgnam is the property name, the parameter cArgs is set to zero, and the parameter lpargResult points to the client-allocated VARIANTARG variable, which is to receive the property value. If the client wants to change the property value, the parameter wFlags is set to DISPATCH_PROPERTYPUT, parameter hgnam is the property name, the parameter rgarg[0] contains the new value, the parameter cArgs contains a 1, and the parameter lpargResult contains a NULL.

The method Invoke allows a client to access an indexed property. The value of the indexes of the property are stored as elements of the parameter rgarg array. For example, if property Prop[5,10] is to be accessed, then parameter rgarg [0] would contain a 10 and parameter rgarg[1] would contain a 5. If the property value is being changed, then the new value is passed as parameter rgarg[2].

The method Invoke uses the language code to interpret the name of the member the client is accessing. The method Invoke maps each name and language code to a unique member. For example, the English name "Set Justify" and the French equivalent would map to the same function member with the appropriate language codes. In addition, the method Invoke uses the language code to map named arguments. The language code is also used to translate data passed as actual arguments from language or country specific units. For example, the method Invoke may map one monetary unit (e.g., dollar) to another (e.g., Franc) or one unit of measurement (e.g., foot) to another (e.g., meter).

The present invention defines the type VARIANTARG to allow arguments of any type to be specified. The VARIANTARG type is a tagged union, with the union preferably allowing all common types. The tag is type VARTYPE, which specifies the type stored in the union. The tag can also indicates whether the value is passed by reference, in which case a pointer to the value, rather than the actual value, is stored in the union. These types are defined as follows:

```
enum {
        VT_EMPTY=0,    //not specified
        VT_NULL,       //propagating null
        VT_I2,         //two-byte signed integer
        VT_I4,         //four-byte signed integer
        VT_R4,         //real, with four-byte precision
        VT_R8,         //real
        VT_CY,         //currency
        VT_DATA,       //date
        VT_STR,        //string
        VT_OBJ,        //object
        VT_ERROR,      //error
        VT_BOOL,       //boolean
        VT_VARIANT,    //a VARIANT
};
#define VT_BYREF   0x4000   //by reference: a pointer to the data is
                            passed
#define VT_ARRAY   0x2000   //an array of the data is passed
typedef unsigned short VARTYPE;
struct VARIANTARG {
        union {
                short iVal;
                long lVal;
                double dblVal;
                CURRENCY curVal;
                BSTR bstrVal;
                IDispatch* pobjVal;
                void* pByrefVal;
        }
        VARTYPE vt;
        short wReserved;
};
```

The vt value governs the interpretation of the union as follows:

| vt | Meaning |
|---|---|
| VT_EMPTY | No value was specified; the argument was defaulted or left blank. |
| VT_EMPTY I VT_BYREF | Illegal combination. |
| VT_I2 | A two-byte integer was specified, its value is in variable iVal. |
| VT_I2 I VT_BYREF | A reference to a two-byte integer was passed, a pointer to the specified variable is in variable pByrefVal. |
| VT_I4 specified, its value is in | A four-byte integer was variable lVal. |
| VT_I4 I VR_BYREF | A reference to a four-byte integer was passed, a pointer to the specified variable is in variable pByrefVal. |
| VT_R4 | A floating point value with the same precision as a four-byte real was specified, its value (converted to an eight-byte real) is in variable dblVal. |
| VT_R4 I VT_BYREF | A reference to a four-byte real was passed, a pointer to the specified variable is in variable pByrefVal. |
| VT_R8 | An eight-byte real was specified, its value is in variable dblVal. |
| VT_R8 I VT_BYREF | A reference to an eight-byte real was passed, a pointer to the specified variable is in variable pByrefVal. |
| VT_CY | A currency value was specified, its value is in variable curVal. |
| VT_CY I VT_BYREF | A reference to a currency value was passed, a pointer to the specified variable is in variable pByrefVal. |
| VT_STR | A string was specified. The string is stored in variable bstrVal. |
| VT_STR I VT_BYREF | A reference to a string was passed, a pointer to the specified variable is in variable pByrefVal. |
| VT_NULL | A propagating NULL value was specified. |
| VT_NULL I VT_BYREF | Illegal combination. |
| VT_ERROR | An error value was specified. The type of error is specified in variable iVal. Generally, operations on error values raise an exception or propagate the error to the return value, as appropriate. |
| VT_ERROR I VT_BYREF | A reference to an error value was passed, a pointer to the value is in variable pByrefVal. |
| VT_BOOL | A boolean (true/false) value was specified. The value is stored in variable lVal. |
| VT_BOOL I VT_BYREF | A reference to a boolean value was passed, a pointer to the specified variable is in variable pByrefVal. |
| VT_DATE | A value denoting a date and time has been specified. The value is stored in variable dblVal. |
| VT_DATE I VT_BYREF | A reference to a date was passed, a pointer to the value is in variable pByrefVal. |
| VT_OBJ | A pointer to an object was specified. A pointer is in variable pobjVal. The object pointed to derives from IDispatch. |
| VT_OBJ I VT_BYREF | Illegal. |
| VT_VARIANT | Illegal. |
| VT_VARIANT I VT_BYREF | The value in variable pByrefVal points to another VARIANTARG instance. The pointed to VARIANTARG instance preferably does not have its VT_BYREF bit set in vt. Thus, only one level of indirection is present. This value can be used to support languages which allow variables passed by reference to have their types changed by the called function. |
| <anything> I VT_ARRAY | An array of that data type was passed. (VT_EMPTY and VT_NULL are illegal types to combine with VT_ARRAY). The variable pByrefVal points to an array descriptor, which describes the dimensions, size, etc. of the array. In a preferred embodiment, the descriptor includes the number of dimensions of the array, for each dimension an upper and lower bounds, and a pointer to the array data. |

During the execution of method Invoke, an error may occur about which the client may want to receive notification. In a preferred embodiment, the method Invoke returns an error indicator and parameter lpExcepInfo, which points to a data structure containing exception information. The data structure contains information describing the error and the name of a help file and context within the help file relating to the error. In a preferred embodiment, the exception data structure is defined as follows:

```
Typedef struct {
    WORD wCode;
    WORD wReserved;
    BSTR strDescription;.
    BSTR strHelpFile;
    DWORD dwHelpContext;
    LPVOID pvReserved;
    SCODE (*lpfnDeferredFillin)(EXCEPINFO * lpExcepInfo);
    DWORD dwReserved;
} EXCEPINFO
```

This structure is used to describe an exception that occurred during the execution of the function.

| Name | Type | Description |
|---|---|---|
| wCode | WORD | An error code describing the error. This error code preferably corresponds to a list to an index into a list of error codes. |
| wReserved | WORD | Reserved value. This value should be set to 0. |
| strDescription | BSTR | A textual, human-readable description of the error. If no description is available, NULL is used. |
| strHelpFile | BSTR | The fully qualified drive, path, and file name of a help file with more information about the error. If no help is available, NULL is used. |
| dwHelpContext | DWORD | The help context of the topic within the help file. This field should be filled in if and only if the strHelpFile field is not NULL. |
| pvReserved | VOID * | Must be set to NULL. |
| lpfnDeferredFillin | | Use of this field allows an application to defer filling in the strDescription, strHelpFile, and dwHelpcontext fields until they are needed. This field might be used, for example, if loading the string for the error is a time-consuming operation. To use deferred fill in, the application should put a function pointer in this slot and not fill any of the other fields except wCode (which is required in any case). When and if the client wants the additional information, it passes the EXCEPINFO structure back to the lpExcepinfo callback function, which fills in the additional information. If deferred fill-in is not desired, this field should be set to NULL. |
| dwReserved | DWORD | Reserved. This field should be set to 0. |

EXAMPLE

Figure 4:
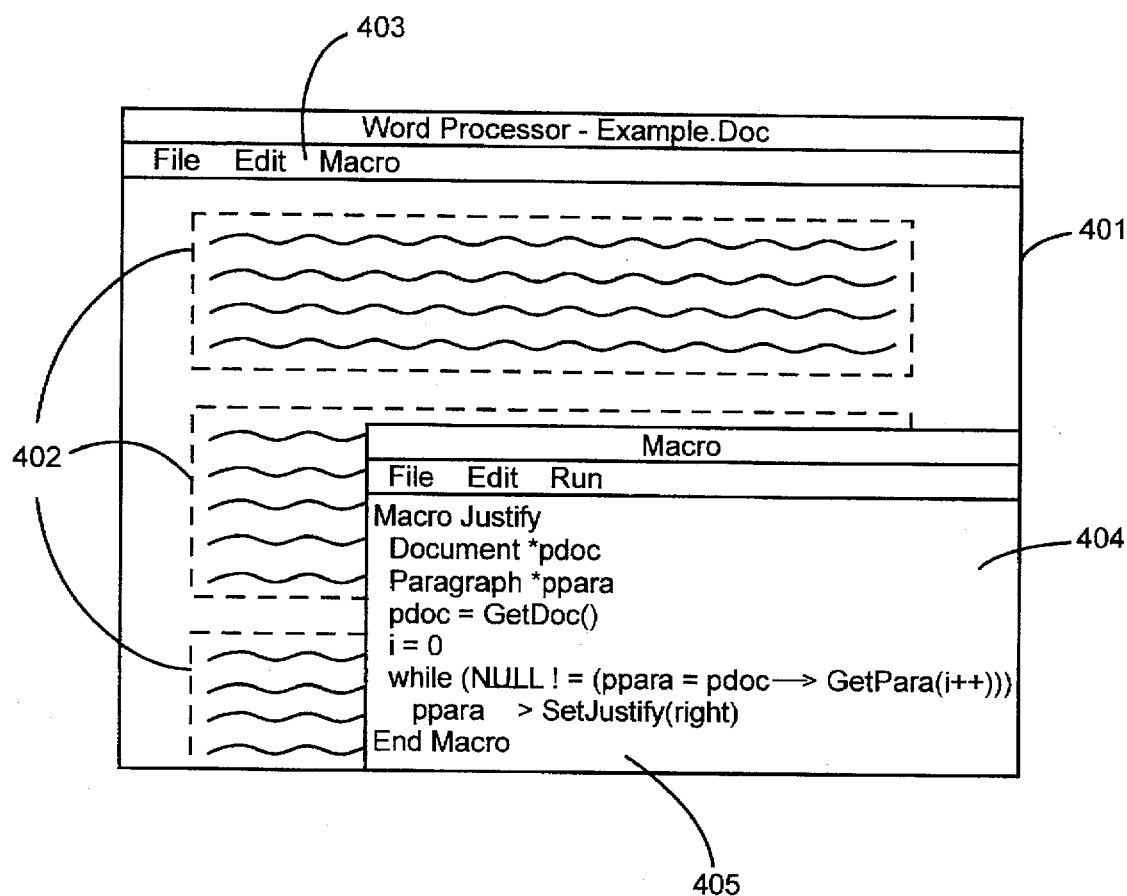
FIG. 4 is a screen layout showing a sample source computer program (source) and client computer program that uses an IDispatch interface.

The following example illustrates the use of an IDispatch interface by an application. FIG. 4 is a screen layout showing a sample source computer program and client computer program that uses an IDispatch interface. The source is a word processor that interacts with a user through window 401. The word processor has opened a document named "example.doc" that contains several paragraphs 402. The word processor has menu 403 for invoking a macro interpreter (client computer program). In this example, the macro interpreter is designed to run as part of the same process of the invoking source. The macro interpreter inputs statements in a C++-like language from a user and interprets the statements. When the user selects the macro menu 403, macro window 404 is created. The user inputs the macro statements 405 and then selects the run menu of the macro window 404 to interpret the macro statements. In this example, the macro statements 405 cause each paragraph in the opened document to be right justified.

Continuing with the example, the developer of the word processor implements an IDispatch interface for each of its objects that are exposed and publishes the type definitions of the objects. The developer of the macro interpreter publishes a description of its C++-like language. The word processor and the macro interpreter are developed with no special knowledge of the other. That is, the word processor is developed knowing only that it needs to load a macro interpreter stored in a file of a predefined name and invoke that macro interpreter when the user selects its macro menu. Similarly, the macro interpreter is developed knowing only that it needs to use the IDispatch interface to access the exposed objects of the source. The same macro interpreter can be invoked by other kinds of source computer programs, such as a spreadsheet or database program. A user uses the documentation of the type definitions of the exposed word processor objects and the published definition of the language of the macro interpreter to develop macros for the word processor. The macro interpreter inputs these macros and interacts with the word processor through IDispatch interfaces to interpret the macros.

Figure 5:
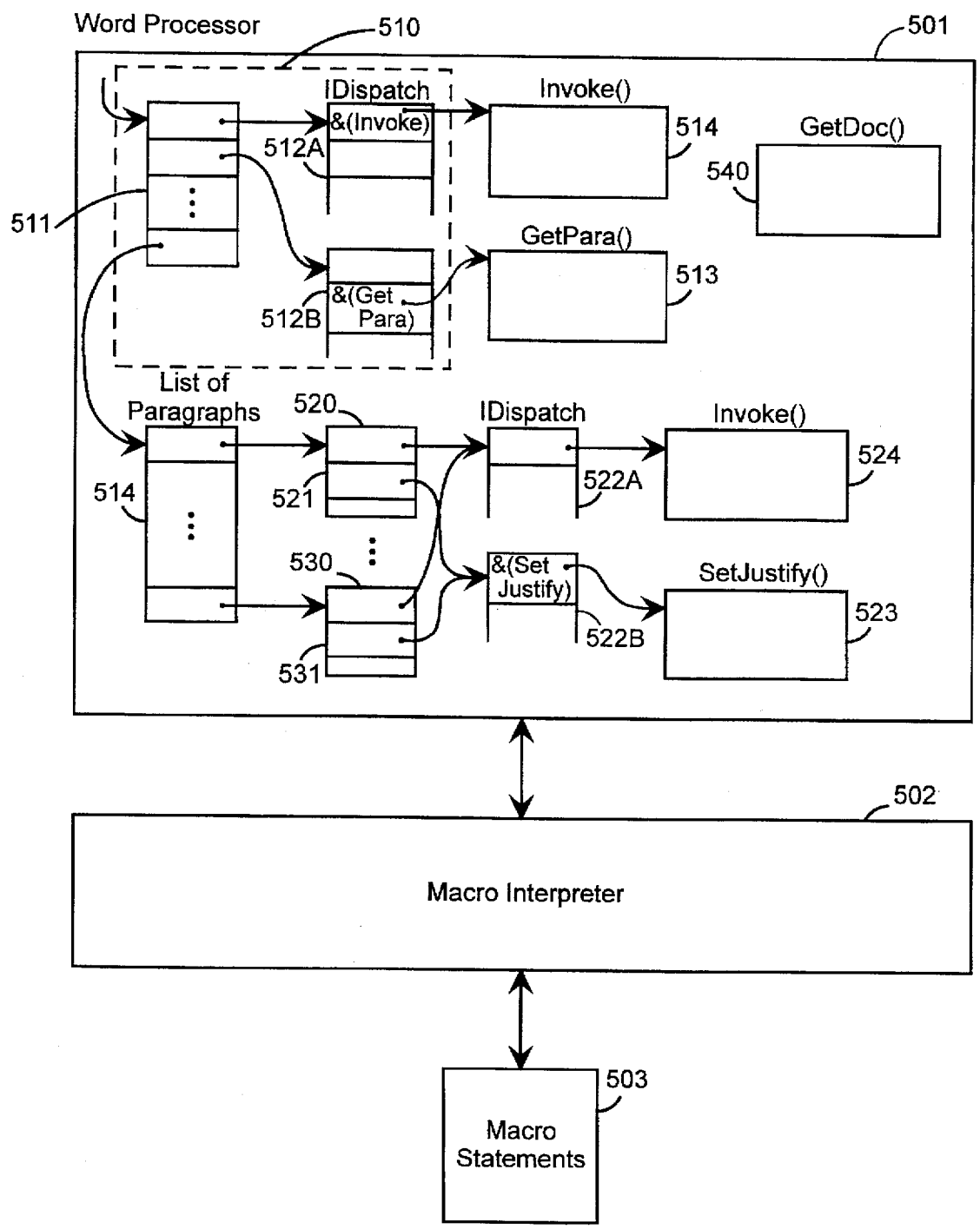
FIG. 5 is a block diagram showing the components used when the word processor invokes the macro interpreter.

FIG. 5 is a block diagram showing the components used when the word processor invokes the macro interpreter. When a user selects the macro menu of the word processor 501, the word processor loads the macro interpreter code 502 in the address space of the word processor 501. In an alternate embodiment, the macro interpreter 502 could be loaded as a separate process and could use standard interprocess communication mechanisms to communicate with the word processor 501. Once the macro interpreter is invoked, the user then inputs macro statements 503. In this example, the word processor 501 exposes objects of type "document" class and "paragraph" class. The document object 510 contains instance data 511 and virtual function tables 512A and 512B. The virtual function table 512A contains pointers to the code that implement the virtual function members of the IDispatch interface of the document class (e.g., Invoke( ) 515). The virtual function table 512B contains pointers to the code that implement the virtual function members of the document class (e.g., GetPara( ) 513). The function member GetPara returns a pointer to the paragraph of the designated index (see below) within the open document. The instance data 511 contains pointers to virtual function tables 512A and 512B and a pointer to a list of paragraphs 514 in the document. The paragraphs are sequentially ordered by index starting at 0. The list of paragraphs 514 contains pointers to the paragraph objects 520, 530, which contain text and properties (e.g., justification) of the paragraphs. The word processor instantiates a paragraph object for each paragraph in the document. Each paragraph object contains instance data 521 and virtual function tables 522A and 522B. The virtual function table 522A contains pointers to the code that implement the virtual function members of the IDispatch interface of the paragraph class (e.g., Invoke( ) 524). The virtual function table 522B contains pointers to the code that implement the virtual function members of the paragraph class (e.g., SetJustify( ) 523). The function member SetJustify sets the paragraph to the designated justification. The word processor also exposes global function GetDoc 540. As its name suggests, the function GetDoc returns a pointer to the document object for the currently open document.

CODE TABLE 1

```
    Macro Justify
1   Document *pdoc
2   Paragraph *ppara
3   pdoc = GetDoc()
4   i = 0
5   while (NULL != (ppara = pdoc->GetPara(i++))
6       ppara->SetJustify("right")
    EndMacro
```

Code Table 1 lists macro statements that set the justification of each paragraph in the open document. The numbers to the left of the statements are for reference. In line 1, the macro declares the variable pdoc to point to a document object. In line 2, the macro declares the variable ppara to point to a paragraph object. In line 3, the macro sets the variable pdoc to point to the document object for the open document. The function GetDoc returns the pointer to the document object. In line 4, the macro sets the variable i to 0. The variable i is used to index through the paragraphs. In lines 5 and 6, the macro loops through each paragraph setting its justification to right justified. The function member GetPara of the document class returns as its value a pointer to the paragraph indexed by its parameter. If the parameter is greater than the number of paragraphs in the open document, then the function return value is set to NULL. The function member SetJustify of the paragraph class sets the paragraph to right justified. The steps that the macro interpreter performs to interpret the macro of Code Table 1. are described in detail below.

CODE TABLE 2

```
Document::Invoke (hgnam, languageCode, wFlags, rgarg,
    cArgs, rghgnamArg, cNamedArgs, lpargResult,
    lpExcepInfo, lpwArgErr)
{
1       if (languageCode == English) then ERROR;
2       switch (hgnam)
3           case GetPara:
4               if (wFlags != DISPATCH_METHOD) then ERROR;
5               if ((cArgs != 1) || (cNamedArgs != 0)) then ERROR;
6               if (rgarg[0].vt != VT_12) then ERROR;
7               if (lpargResult == NULL) then ERROR;
8               ptr = this->GetPara(rgarg[0].iVal);
9               ptr->QueryInterface("IDispatch", pIDispatch);
10              lpargResult.vt = VT_OBJ;
11              lpargResult.pobjval = pIDispatch;
12              break;
13          default:
14              ERROR;
};
```

Code Table 2 lists sample pseudocode for the method Invoke of the IDispatch interface for a document object. In line 1, if the passed language code does not specify English, then an error is returned. Lines 2 through 14 comprise a switch statement with a case label for each method that the document class allows to be invoked through the IDispatch interface. In line 2, the method branches to the appropriate case label based on the passed method name. One skilled in the art would appreciate that the handle hgnam is equivalent to a character string. Line 3 through 12 comprise the code for invoking the GetPara method. In lines 4 through 7, the method validates the passed parameters. In line 4, if the parameter wFlags does not indicate that a method is being invoked, then the method returns an error. In line 5, if the number of arguments is not equal to one or the number of named arguments is not equal to 0, then the method returns an error. The method GetPara takes only one parameter. In line 6, if the parameter passed for the method GetPara is not a two byte integer, then the method returns an error. Alternatively, the method Invoke could convert the types. For example, if the parameter was a four-byte integer, then the method could convert it to a two-byte integer. In line 7, if the pointer for the return argument is null, then the method returns an error. In line 8, the method invokes the method GetPara passing it the argument received by the method Invoke. The method Invoke stores the value returned in the variable ptr. In line 9, the method retrieves the IDispatch interface of the paragraph object. In line 10, the method sets the type of the result. In line 11, the method set the return pointer to point to the IDispatch interface of the paragraph.

CODE TABLE 3

```
Paragraph::Invoke (hgnam, languageCode, wFlags, rgarg,
    cArgs, rghgnamArg, cNamedArgs, lpargResult,
    lpExcepInfo, lpwArgErr)
{
1       if (languageCode == English) then ERROR;
2       switch (hgnam)
3           case SetJustify:
4               if (wFlags != DISPATCH_METHOD) then ERROR;
5               if ((cArgs != 1) || (cNamedArgs != 0)) then ERROR;
6               if (rgarg[0].vt != VT_STR) then ERROR;
8               ptr = this->SetJustify(rgarg[0].iVal);
9               ptr->QueryInterface("IDispatch", pIDispatch);
12              break;
13          default:
14              ERROR;
};
```

Code Table 3 lists sample pseudocode for the method Invoke of the IDispatch .interface for the paragraph class. Each line is analogous to the lines of Code Table 2. Lines 7, 10, and 11 of Table 2 have to corresponding lines in Table 3 because the method SetJustify of the paragraph class has no return value.

Figure 6:
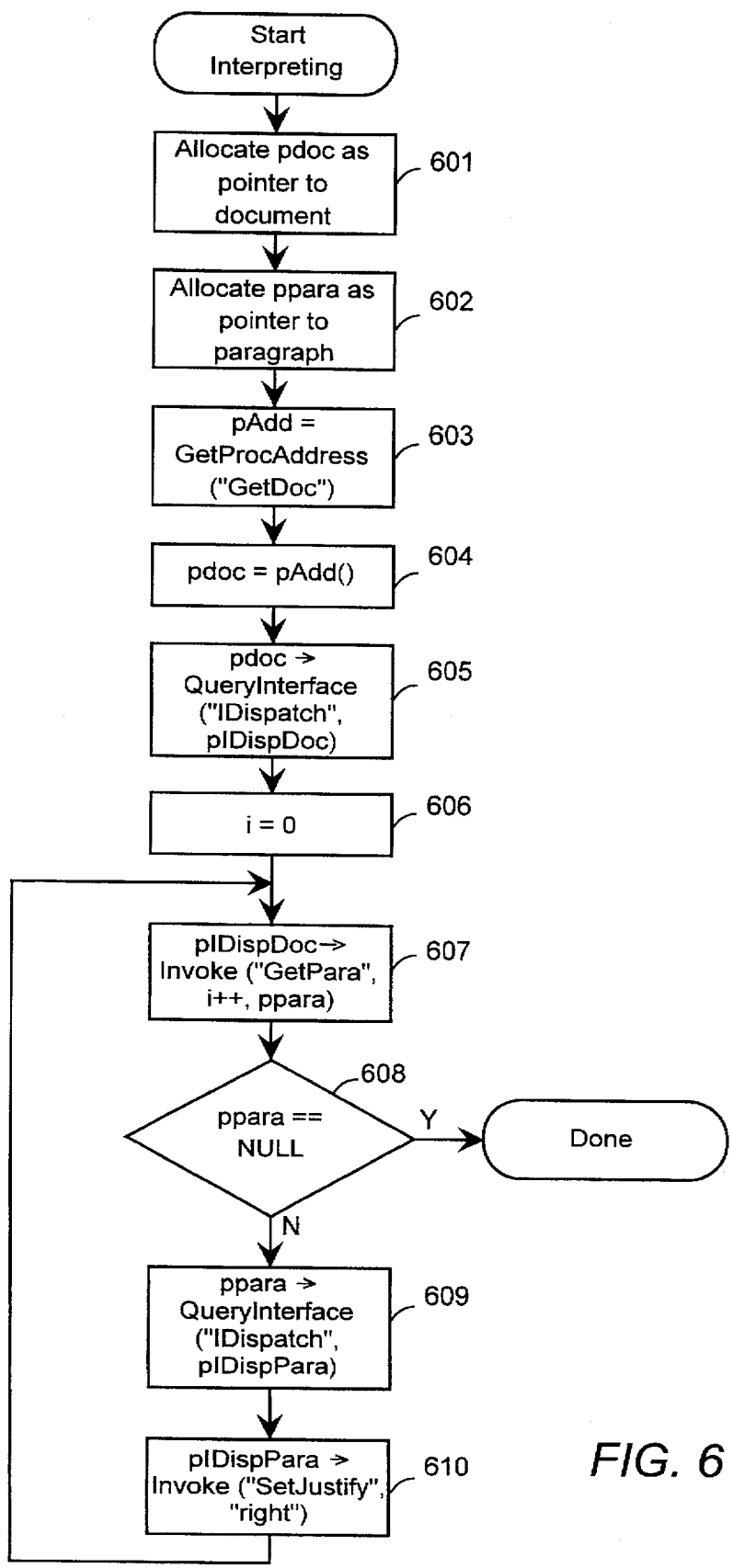
FIG. 6 is a diagram showing steps the macro interpreter executes to interpret the macro of Code Table 1.

FIG. 6 is a diagram showing steps the macro interpreter executes to interpret the macro of Code Table 1. FIG. 6 does not represent a flow diagram of the macro interpreter, but rather represents those steps the macro interpreter executes when interpreting the macro of Code Table 1. In step 601, the macro interpreter allocates memory for the variable pdoc, which is a pointer to a document type. In step 602, the macro interpreter allocates memory for the variable ppara, which is a pointer to a paragraph type. In steps 603 and 604, the macro interpreter interprets line 3 of Code Table 1. In step 603, the macro interpreter invokes routine GetProcAddress passing it the name of the function GetDoc. The routine GetProcAddress returns the address of the function GetDoc within the address space of the word processor. In step 604, the macro interpreter invokes the function GetDoc. The function returns as its value a pointer to the document object for the open document in the word processor. The macro interpreter sets the variable pdoc to the return value. In step 605, the macro interpreter invokes the method QueryInterface to retrieve a pointer to the IDispatch interface of the open document. If the method QueryInterface returns a null value, the macro interpreter reports an error because the document object does not support the IDispatch interface. In step 606, the macro interpreter interprets line 4 of Code Table 1. The macro interpreter sets the variable i to 0. In steps 607 through 610, the macro interpreter interprets lines 5 and 6 of Code Table 1. In step 607, the macro interpreter invokes the method Invoke of the IDispatch interface of the opened document. The macro interpreter passes the method Invoke the name of the function member to execute (GetPara) and the variable i. The method returns the result of the GetPara function member in the variable ppara. The GetPara function member returns a pointer to a paragraph object of the designated index. The parameters shown in step 607 represent the actual parameters that would be represented by the parameters hgnam, rgarg, and lpargResult as described above. In step 608, if the variable ppara is equal to null, then all the paragraphs have been processed and the macro interpreter is done interpreting the Code Table 1, else the macro interpreter continues at step 609. In step 609, the macro interpreter invokes the method QueryInterface to retrieve a pointer to the IDispatch interface of the paragraph. (Alternatively, the method GetPara could return a pointer to the IDispatch interface as shown in Code Table 2.) If the method QueryInterface returns a null value, then the macro interpreter reports an error because the paragraph object does not support the IDispatch interface. In step 610, the macro interpreter invokes the method Invoke of the IDispatch interface of the paragraph. The macro interpreter passes the method Invoke the name of the function member of the paragraph object to execute (SetJustify), and the parameter "right." The function member SetJustify has no return value. The macro interpreter then loops to step 607 to continue execution of the loop of lines 5 and 6 of Code Table 1.

In an alternate embodiment of the present invention, the IDispatch interface allows names of members and parameters to be identified by an ordinal that is defined by the implementor of an object. The IDispatch interface includes a function member which is passed a name and returns an ordinal. A client then uses the ordinal when invoking the method Invoke rather than the handle to an entry in a name table. The ordinal is preferably persistent so that the client can cache the ordinal for subsequently invoking the method Invoke for another instance of the same type of object. In this alternate embodiment, the IDispatch interface is defined as follows:

```
class IDispatch:public IUnknown {
public:
    virtual SCODE GetIDsOfNames(  REFIID        riid,
                                  char          rgszNames[],
                                  INT           cNames,
                                  WORD          languageCode,
                                  LONG          rgdispid[]) = 0;
    virtual SCODE Invoke (         LONG          rgdispid,
                                  REFIID        riid,
                                  WORD          languageCode,
                                  WORD          wFlags,
                                  VARIANTARG    rgarg[],
                                  INT           cArgs,
                                  LONG          rghgnam[],
                                  INT           cNamedArgs,
                                  VARIANTARG    *lpargResult,
                                  EXCEPINFO     *lpExcepinfo,
                                  WORD          *lpwArgErr) = 0;
}
```

The method GetIDsOfNames inputs the name of a member and optionally the names of named arguments when the member is a function. The method GetIDsOfNames generates a unique ordinal for the name of the member and each named argument. The method GetIDsOfNames returns the ordinals in an array. The parameter riid specifies the interface of the member. If the parameter riid is null, then the member belongs to a default interface. The parameter rgsznames is an array of names. The first name is a name of the member for which an ordinal is to be returned. Any other names are the names of named arguments for which an ordinal is to be returned. The parameter cNames indicates the number of names in parameter rgsznames. The parameter languageCode indicates the natural language of the names. The parameter rgdispid is an array of the returned ordinals for the corresponding names in the parameter rgsznames.

The method Invoke generally has the same behavior and parameters as discussed above except that the parameter hgnam is replaced by the parameters rgdispid and riid. The parameter rgdispid indicates the ordinal for the member, and the parameter riid specifies the interface of the member. If the parameter riid is null, then the member belongs to a default interface.

Although the present invention has been described in terms of a preferred embodiment, it is not intended that the invention be limited to these embodiments. Modifications within the spirit of the invention will be apparent to those skilled in the art. The scope of the present invention is defined by the claims that follow.

We claim:

1. A method in a computer system for accessing one of a plurality of properties of an object, each property having a name, said object having a name, said method comprising the computer-implemented steps of:

designating one of said properties as an unnamed property that is the property of said properties accessed when said object is identified without identifying the name of a property;

receiving input containing an identifier of the name of said object, wherein the input does not contain an identifier of the name of said property;

parsing said received input, wherein it is detected that the identifier of the name of said property is not contained within the input; and in response to detecting that the identifier of the name of said property is not contained in the input, accessing the unnamed property of said object and not other properties of said properties.

2. A method in a computer system for accessing a default property of an object, said object being provided by a source computer program and being accessible by a client computer program, said object having a plurality of properties, said method comprising the computer-implemented steps of:

during execution of said source computer program, instantiating said object, said object having a dispatching interface, said dispatching interface having an invoking function member, for controlling access to said default property of said object;

during execution of said client computer program, invoking said invoking function member with an indication that a property of said object is to be accessed without explicitly indicating which property to access; and during execution of said invoking function member, accessing said default property of said object when said invoking function member is invoked without explicitly indicating which property to access.

3. The method of claim 2 wherein said default property has a value, and the step of accessing said default property of said object retrieves said value of said default property and returns said value to said client computer program.

4. The method of claim 2 wherein said default property has a value, and the step of invoking said invoking function member includes the step of passing a value from said client computer program to said invoking function member and the step of accessing said default property of said object includes the step of storing said passed value as the value of said default property of said object.

5. A method in a computer system for accessing a default property of an object, said object having a plurality of properties, said method comprising the computer-implemented steps of:

- instantiating said object, said instantiated object having a dispatching interface, said dispatching interface having an invoking function member, said invoking function member for controlling access to said properties of said object, one of said properties being designated as a said default property;
- invoking said invoking function member with an indication that one of said properties is to be accessed without explicitly indicating a name of a property; and
- during execution of the invoking function member, and when a property is to be accessed without explicitly indicating the name of a property, accessing said default property of said object.

6. A computer-readable medium containing instructions for controlling a computer system to perform a method for accessing one of a plurality of properties of an object, each property having a name, the object having a name, the method comprising the steps of:

- designating one of the properties as an unnamed property that is the property of the properties accessed when the object is identified without identifying the name of a property;
- receiving input containing an identifier of the name of the object, wherein the input does not contain an identifier of the name of the property;
- parsing the received input, wherein it is detected that the identifier of the name of the property is not contained within the input; and
- in response to detecting that the identifier of the name of the property is not contained in the input, accessing the unnamed property of the object and not other properties of the properties.

7. A computer-readable medium containing instructions for controlling a computer system to perform a method for accessing a default property of an object, the object being provided by a source computer program and being accessible by a client computer program, the object having a plurality of properties, the method comprising the steps of:

- during execution of the source computer program, instantiating the object, the object having a dispatching interface, the dispatching interface having an invoking function member, for controlling access to the default property of the object;
- during execution of the client computer program, invoking the invoking function member with an indication that a property of the object is to be accessed without explicitly indicating which property to access; and
- during execution oft he invoking function member, accessing the default property of the object when the invoking function member is invoked without explicitly indicating which property to access.

8. The computer-readable medium of claim 7 wherein the default property has a value, and wherein the step of accessing the default property of the object retrieves the value of the default property and returns the value to the client computer program.

9. The computer-readable medium of claim 7 wherein the default property has a value, and wherein the step of invoking the invoking function member includes the step of passing a value from the client computer program to the invoking function member and the step of accessing the default property of the object includes the step of storing the passed value as the value of the default property of the object.

10. A computer-readable medium containing instructions for controlling a computer system to perform a method for accessing a default property of an object, the object having a plurality of properties, the method comprising the steps of:

- instantiating the object, the instantiated object having a dispatching interface, the dispatching interface having an invoking function member, the invoking function member for controlling access to the properties of the object, one of the properties being designated as a default property;
- invoking the invoking function member with an indication that one of the properties is to be accessed without explicitly indicating a name of a property; and
- during execution of the invoking function member, and when a property is to be accessed without explicitly indicating the name of a property, accessing the default property of the object.

11. A method in a computer system for accessing one of a plurality of properties of an object, each property having a name, the object having a name, the method comprising the steps of:

- designating one of the properties as an unnamed property that is accessed when the object is identified without identifying the name of a property;
- receiving input containing an identifier of the name of the object and a value, wherein the input does not contain an identifier of the name of the property;
- parsing the received input, wherein it is detected that the identifier of the name of the property is not contained within the input; and
- in response to detecting that the identifier of the name of the property is not contained in the input, setting the unnamed property of the object to the value.

12. A computer-readable medium containing instructions for controlling a computer system to perform a method for accessing one of a plurality of properties of an object, each property having a name, the object having a name, the method comprising the steps of:

- designating one of the properties as an unnamed property that is accessed when the object is identified without identifying the name of a property;
- receiving input containing an identifier of the name of the object and a value, wherein the input does not contain an identifier of the name of the property;
- parsing the received input, wherein it is detected that the identifier of the name of the property is not contained within the input; and
- in response to detecting that the identifier of the name of the property is not contained in the input, setting the unnamed property of the object to the value.

* * * * *